April 5, 1966 R. NITSCH ET AL 3,244,812

CIRCUIT ARRANGEMENT FOR COMMUNICATION SYSTEMS WHEREIN LINES ARE INTERCONNECTED OVER COUPLING MULTIPLES

Filed March 26, 1962 4 Sheets-Sheet 1

April 5, 1966 R. NITSCH ETAL 3,244,812

CIRCUIT ARRANGEMENT FOR COMMUNICATION SYSTEMS WHEREIN LINES ARE INTERCONNECTED OVER COUPLING MULTIPLES

Filed March 26, 1962 4 Sheets-Sheet 2

3,244,812

CIRCUIT ARRANGEMENT FOR COMMUNICATION SYSTEMS WHEREIN LINES ARE INTERCONNECTED OVER COUPLING MULTIPLES

Rudolf Nitsch, Munich, and Ralf Kähler, Munich-Solln, Germany, assignors to Siemens & Halske Aktiengesellschaft Berlin and Munich, a corporation of Germany Filed Mar. 26, 1962, Ser. No. 183,347
Claims priority, application Germany, Apr. 4, 1961, S 73,306
4 Claims. (Cl. 179—18)

The invention disclosed herein is concerned with a circuit arrangement for communication systems, especially telephone systems, in which connections are established between lines of a first kind, for example, incoming lines, and lines of a second kind, for example, outgoing lines, over coupling multiples, also referred to as cross point networks, wherein each one of a plurality of lines of the first kind crosses with each one of a plurality of lines of the second kind, and wherein coupling points are provided at the crossing points, over which the respective mutually crossing lines are to be interconnected by means of coupling contacts which are respectively operatively actuated by coil means individual thereto.

In order to permit actuation of the individual coils of the coupling points independently of one another, it is known to connect each coil to marker conductors which are respectively cooperatively associated with one of the lines of the first kind and one of the lines of the second kind, and to energize such coil by the actuation of respective marker contacts. Rectifiers, glow lamps or the like are in the known arrangements connected in series with each coil so as to avoid branching of currents over coils of other coupling points.

Such arrangements have, aside from the expenditure with respect to rectifiers etc., the drawback, that the voltage drop at the rectifiers, and the aging of the rectifiers, must be considered in designing the circuitry for the cross point network or coupling multiple. It may also happen, in the case of large coupling multiples, that the current flowing through an unmarked coil of a coupling point, which current results from the sum of the individual blocking currents of all rectifiers operating in blocking direction, becomes higher than the current permitted to flow through such coil without causing operative actuation thereof (non-operate current), thus setting limits with respect to the size or capacity of such coupling multiples.

In order to avoid the use of rectifiers and glow lamps, and the drawbacks connected therewith, the marking contacts may be cooperatively associated with the coupling points instead of with the conductors. While this requires a greater expenditure so far as marking contacts are concerned, it is more economical owing to the savings effected with the elimination of the rectifiers. However, such coupling multiples are applicable only in cases in which the coils are operatively connected by the actuation of keys, that is, in cases in which key actuated contacts serve as marking contacts. The provision of marking contacts which are individual to the respective coupling points would be impractical in the case of centrally or remotely controlled marking of a coupling multiple, because it would require the provision, for each centrally or remotely arranged marker contact, of two conductors extending from the respective coupling point to the cooperatively associated marker contact, thus necessitating too great an expenditure so far as the control and marker lines are concerned.

The object of the invention is to avoid the expenditures required in known arrangements and the drawbacks thereof. This is achieved by assigning to each coupling point a control contact, for cooperation therewith, which contact is actuated after effecting the marking of the line of the first kind which is to be connected, and which is operative, depending upon the marking of the line of the second kind, which is to be connected with the line of the first kind, to close a circuit for the operative actuation of the coupling contacts at the respective coupling point, which circuit is to be switched through.

The invention makes it possible to mark a coupling point, by marking the two lines of different kind, which are to be interconnected, without requiring the use of rectifiers or glow lamps or the like. Accordingly, a central marker will require the provision of only one conductor for each line of the first kind and one conductor for each line of the second kind, thus greatly reducing the expenditure with respect to marker lines, as compared with the known arrangements which operate without rectifiers, glow lamps, or the like.

In accordance with the invention, the expenditure with respect to marker lines can be further reduced in the case of installations in which a connection extends over at least two coupling stages, comprising respectively a plurality of coupling multiples, wherein each coupling multiple of each coupling stage is connected over only one trunk line with each coupling multiple of the preceding and/or succeeding coupling stage. In such installation, the control contacts of the coupling stage can be utilized to effect the marking of the lines, of one of the two kinds, in the preceding or in the succeeding coupling stage.

Further details and features of the invention will be described below with reference to the accompanying drawings, showing examples thereof.

Figure 1:
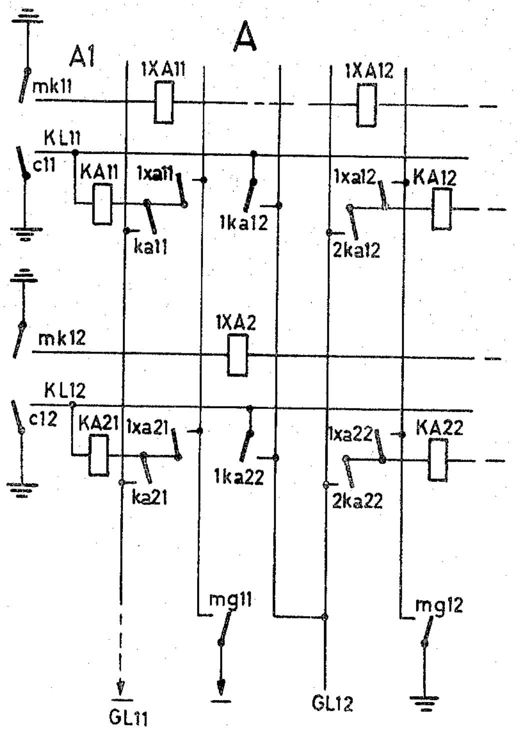
FIG. 1 shows an arrangement for extending a connection over a coupling stage.
Figure 2:
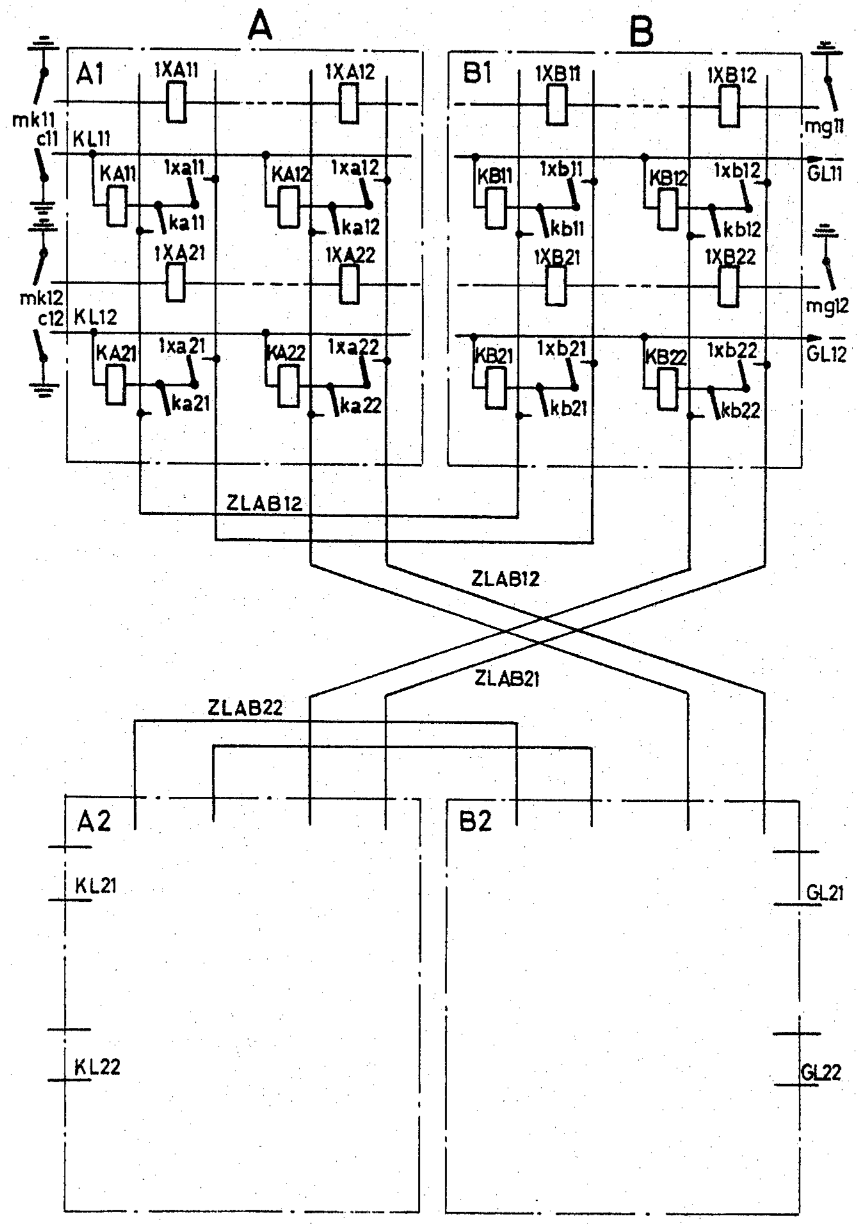
FIG. 2 illustrates an arrangement for extending a connection over two coupling stages.
Figure 3:
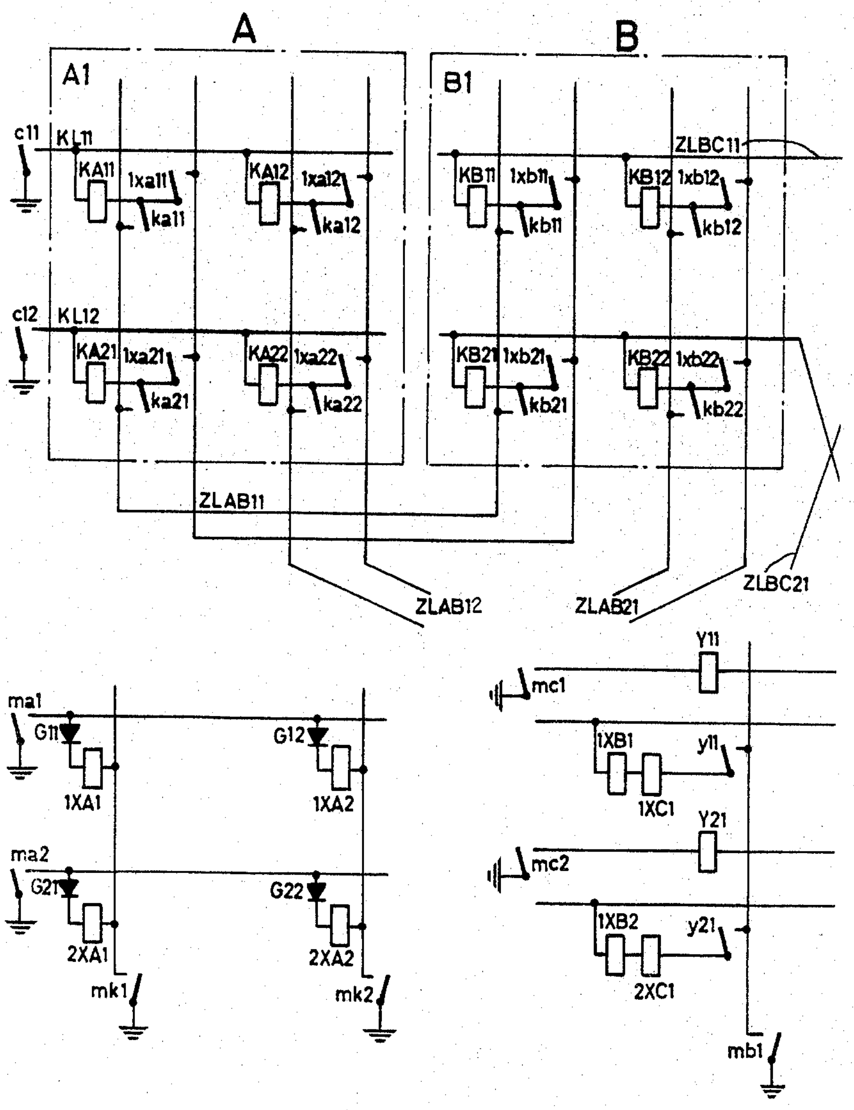
FIGS. 3 and 3*a* placed side by side, represent an arrangement wherein a connection extends over relatively many coupling stages.
Figure 3A:
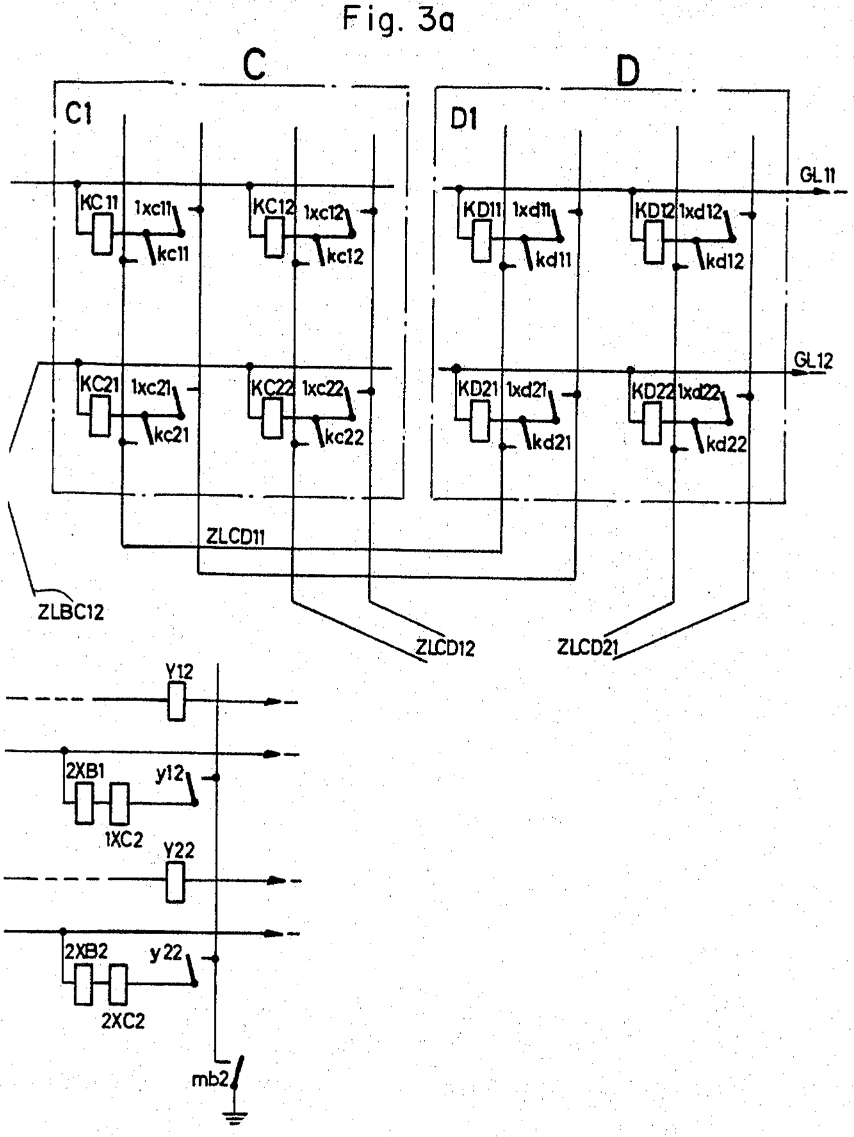

It is in each example assumed that the respective arrangements are affected by a marker, such marker accordingly serving in FIG. 1 one coupling stage, in FIG. 2 two coupling stages, and in FIGS. 3 and 3*a* four coupling stages. It is, of course, self-evident that further coupling stages, affected by the same marker or by other markers, can be provided in series relationship with the illustrated coupling stages for the building up of connections.

The structure and operation of the arrangements according to the invention will now be explained more in detail with reference to the drawings.

FIG. 1 shows the control or private conductors of two incoming lines KL11 and KL12, which are, in a coupling multiple A1 of a coupling stage A, in crossing relationship with similar conductors of two outgoing lines GL11 and GL12. At the crossing or coupling points are disposed coupling relays KA11, KA12, KA21 and KA22, having coupling contacts over which connections can be established between the respective crossing lines. Control contacts 1*xa*11, 1*xa*12, 1*xa*21 and 1*xa*22 are provided which are respectively individual to the coupling points, and over which are closed the energizing circuits for the respective coupling relays. These control contacts may be actuated either by coils, such for example as 1XA11 and 1XA12 which are respectively individual to the contacts 1*xa*11 and 1*xa*12 of the line KL11, or by a coil which is common to all control contacts at the coupling points of a line, for example, coil 1XA2, for the contacts 1*xa*21 and 1*xa*22 of the line KL12. The corresponding coils are energized respectively over marker contacts of the lines KL11 and KL12 which are to be interconnected, such marker contacts being indicated at *mk*11 and *mk*12, and the corresponding coils being operative to actuate their control contacts 1*xa*11, 1*xa*12 and 1*xa*21, 1*xa*22, respectively, for closing the energizing circuits for the coupling relays, at the coupling point which is to be switched through, depending upon actuation of the respective marker contacts *mg*11 or *mg*12 of the outgoing line which is to be used in extending a connection.

For example, the marker contacts *mk*11 and *mg*11 will be closed when the line KL11 is to be connected with the line GL11. The control contacts 1*xa*11 and 1*xa*12 are closed responsive to energization of the coils 1XA11 and 1XA12. An energizing circuit is closed for the couplings relay KA11, extending over the contact *c*11 at the input of the coupling multiple A1, of a seizure or private relay (not shown), and over the contacts 1*xa*11 and *mg*11. The coupling relay KA12 cannot energize since contact *mg*12 is open. Contact *ka*11 is closed upon energization of relay KA11, over which the latter is held energized independently of the marker contacts.

The negative potential indicated in connection with the private conductor of the line GL11 may be placed thereon, for example, by a relay set which is to be seized, or may be fixedly connected thereto at the input of a succeeding selection stage.

In case a connection is to be extended over a plurality of directly successively arranged coupling stages, the coupling relays may be fixedly connected with a negative potential, as indicated in connection with the coupling relays KA12, KA22, so as to make the ground potential extended over the contact *c*11 of the calling line KL11 effective in the succeeding coupling selection stages. The holding circuit of the coupling relay, for example, relay KA12 will then extend over its contacts 1*ka*12, 2*ka*12. Such a circuit can be employed particularly in a case in which each of a plurality of successive coupling or selection stages is successively switched through by means of setting sets or markers which are individual to the respective coupling or selection stages.

However, in the event that a connection is to be abruptly switched through over a plurality of coupling stages which are, for example, served by a common marker, a series circuit of the coupling relays of all successive coupling stages may be used, as indicated in FIGS. 2, 3 and 3*a*, since the marking of the coupling relays is effected simultaneously. The coupling relays KA11 and KA21 are in such case circuited as indicated in FIG. 1.

FIGS. 2, 3 and 3*a* show arrangements in which a connection is to be switched through over a plurality of coupling stages A, B or A, B, C, D, respectively, each coupling stage including a plurality of coupling multiples, for example, A1, A2. In these arrangements, each coupling multiple of a coupling stage is by means of an intermediate line or trunk, for example ZLAB11, connected with each coupling multiple of the preceding and/or succeeding coupling stage.

For example, in case a connection is to be switched through between the incoming line KL11 and the outgoing line GL11 of the arrangement shown in FIG. 2, only the marker contacts *mk*11 and *mg*11 of these lines need be closed. The marking of the intermediate or trunk line which is to be utilized is in such case effected over the control contacts at the involved coupling points of the two coupling multiples A1 and B1 of the coupling stages A and B.

Contact *mk*11 switches in the coils 1XA11, 1XA12 and contact *mg*11 switches in the coils 1XB11, 1XB12, such coils closing, upon energization thereof, the control contacts 1*xa*11, 1*xa*12 and 1*xb*11, 1*xb*12. The closure of contacts 1*xa*12 and 1*xb*12 remains without effect since they are assigned to coupling points lying respectively on intermediate lines ZLAB12 and ZLAB21 extending respectively to the coupling multiples B2 and A2 having no marker contacts connected at the inputs and outputs thereof. However, the intermediate line ZLAB11 will be marked by contacts 1*xa*11, 1*xb*11 as the line which is to be used. The coupling relays KA11 and KB11 energize in series circuit and remain energized in series over contact *c*11 and their holding contacts *ka*11 and *kb*11.

In the arrangement according to FIGS. 3 and 3*a*, the coils assigned to the control contacts, for example, control contacts 1*xa*11, 1*xa*12 of a horizontal coupling point row, are combined in a coil 1XA1. In order to bring out details more clearly, the coils serving for the actuation of the control contacts are in this embodiment shown, separate from the coupling multiple, in the lower parts of the figures. In order to avoid the use of a special marking contact for each incoming line, a marking contact such, for example, as *mk*1 is assigned in common to all corresponding incoming lines of all coupling multiples of the coupling stage A, and the selection of coils to be energized, for example, 1XA1, of control contacts 1*xa*11, 1*xa*12, takes place additionally by means of a marker contact, for example, *ma*1, which respectively determines and marks the involved coupling multiple A1. The coils of the control contacts can then be arranged, just like the coupling relays, in a crossing field which can be decoupled by means of rectifiers G11, G12, G21, G22, as is for example indicated for the coils 1XA1, 1XA2 and 2XA1, 2XA2 of the two horizontal coupling point rows of the respective coupling multiples A1 and A2 of the first coupling stage A. The marking contact *mk*1 of all first lines of all coupling multiples of the coupling stage A and the marking contact *ma*1 of the coupling multiple A1 are actuated to effect operative actuation of the control contacts 1*xa*11, 1*xa*12 of the line KL11. The same applies to the coils (not shown) of the control contacts of the coupling stage D.

Over which of the coupling multiples of the coupling stages B or C, respectively, a connection is to be switched through, is determined by the routing which can be effected in desired manner. The switching in of the coils of the control contacts of these coupling stages is likewise carried out in a cross field which is marked by contacts, such for example as contacts *mb*1 and *mc*1, which determine the respective coupling multiple to be used, for example, the multiple B1 or C1. The coils assigned to the control contacts of corresponding horizontal coupling point rows of both coupling stages B and C, can be connected in series relationship. As contrasted with the crossing field containing the coils of the control contacts of the coupling stage A, the crossing field containing the coils of the coupling stages B and C is not decoupled by rectifiers, but, just like a coupling field according to the invention, by control contacts *y*11, *y*12, *y*21, *y*22, to which are assigned coils Y11, Y12, Y21, Y22, such coils being respectively energized over marker contacts *mc*1 and *mc*2, so that a pair of coils, for example, 1XB1 and 1XC1, of the control contacts in the coupling multiples of the coupling stages B and C, is energized over one of the respective marking contacts *mb*1, *mb*2, respectively, responsive to closure of the control contacts *y*11, *y*12, or *y*21, *y*22.

The cross fields including the coils for the coupling stages A and D may also be constructed as explained in connection with the cross field for the control contacts of the coupling stages B and C. As previously noted, each control contact may have a coil individual thereto or a coil may be common to the control contacts of all coupling points of a coupling point row. The coils for the control contacts can also be used for actuating the contacts of the coupling points, so that the illustrated coils of the coupling relays need be designed merely for the energization required for the holding of the contacts. However, it is to be observed in this case, that the control contacts must not be held under the influence of the coils of the coupling relays.

Changes may be made within the scope and spirit of the appended claims which define what is believed to be new and desired to have protected by Letters Patent.

We claim:

1. A circuit arrangement for a communication system, especially a telephone system, comprising lines of a first kind which are to be connected together with lines of a second kind, each of a plurality of lines of first kind being disposed in crossing relationship with each of a plurality of lines of the second kind, coupling contacts at the respective crossing points for interconnecting conductors of the corresponding crossing lines, coils individual to the respective coupling contacts for independently operating the associated coupling contacts, control contacts for each coupling point, each coil being operatively connected to the corresponding line of the first kind and to the coupling and control contacts at the corresponding point associated therewith, circuit means responsive to the marking of a line of the first kind for effecting actuation of the control contacts associated with such marked line, and circuit means responsive to the marking of a line of the second kind for closing a circuit over the corresponding actuated control contacts associated with the marked line of the first kind and the marked line of the second kind, to energize the coil at the selected coupling point and thereby actuate the associated coupling contact.

2. A circuit arrangement according to claim 1, wherein said coils, which are respectively individually assigned to the coupling points for the actuation of the corresponding coupling contacts are arranged to serve as energization coils and also as holding coils.

3. A circuit arrangement for a communication system, especially a telephone system, wherein a connection is to be extended over at least two coupling stages, comprising a plurality of coupling multiples, each having lines of a first kind which are to be connected together with lines of a second kind disposed in crossing relationship therewith, each of a plurality of lines of the second kind of each coupling multiple of coupling stage being permanently connected with a single line of one of the two kinds of only one respective coupling multiple of an associated coupling stage, each of the coupling multiples having coupling contacts at the crossing points of the lines of the first and the second kind, individual coil means for independently operating said coupling contacts, control contacts for each of said individual coil means, and circuit means for effecting actuation of such control contacts of a coupling stage, thereby operative to also effect the marking of lines of one of the two kinds in a respective associated coupling stage.

4. A circuit arrangement according to claim 3, wherein the circuit for the actuation of the coupling contacts extends in series relation over all coupling stages.

References Cited by the Examiner

UNITED STATES PATENTS

| | | | |
|---|---|---|---|
| Re. 16,293 | 3/1926 | Richardson | 179—18 |
| 2,925,471 | 2/1960 | Licht | 179—18 |
| 3,015,698 | 1/1962 | Pedrick | 179—18 |

ROBERT H. ROSE, *Primary Examiner.*